United States Patent [19]
Onishi et al.

[11] Patent Number: 5,500,179
[45] Date of Patent: Mar. 19, 1996

[54] METHOD OF MANUFACTURING HARNESS PART FOR AUTOMOBILE

[75] Inventors: Yasuhiko Onishi; Takashi Yamamori; Youzou Yamashita; Ichiro Suzuki; Toshiya Aoyama, all of Yokkaichi, Japan

[73] Assignee: Sumitomo Wiring Systems, Ltd., Yokkaichi, Japan

[21] Appl. No.: 189,740

[22] Filed: Feb. 1, 1994

[30] Foreign Application Priority Data

Feb. 2, 1993 [JP] Japan .................... 5-039438

[51] Int. Cl.⁶ .................. B29C 49/04; B29C 49/20; B29C 49/22

[52] U.S. Cl. .................. 264/400; 264/515; 264/516; 264/540; 264/152

[58] Field of Search .................. 264/22, 25, 515, 264/516, 173, 540, 531, 152

[56] References Cited

U.S. PATENT DOCUMENTS

| | | | |
|---|---|---|---|
| 3,140,329 | 7/1964 | Nutting | 264/516 |
| 3,790,744 | 2/1974 | Bowen | 264/22 |
| 4,296,157 | 10/1981 | Conti | 264/173 |
| 4,362,688 | 12/1982 | Nakagawa | 264/540 |
| 4,549,066 | 10/1985 | Piccicli et al. | 264/22 |
| 4,667,384 | 5/1987 | Miller | 264/25 |
| 4,738,612 | 4/1988 | Kikuchi et al. | 264/540 |
| 4,782,728 | 11/1988 | Thatcher | 264/536 |
| 4,952,359 | 8/1990 | Wells | 264/173 |
| 5,104,472 | 4/1992 | Kasugai et al. | 264/516 |

FOREIGN PATENT DOCUMENTS

| | | | |
|---|---|---|---|
| 59-020630 | 2/1984 | Japan | 264/516 |
| 4-312831 | 11/1992 | Japan | 264/516 |

*Primary Examiner*—Catherine Timm
*Attorney, Agent, or Firm*—Sughrue, Mion, Zinn, Macpeak & Seas

[57] ABSTRACT

A method of manufacturing a wire harness protector (2), which can reduce the manufacturing cost with excellent productivity. A resin material is employed to form a hollow compact (1) by numerically controlled (NC) blow molding. Then, the as-formed hollow compact (1) is cut with a laser beam to remove unnecessary portions, thereby manufacturing a solid wire harness protector (2).

1 Claim, 19 Drawing Sheets

METHOD OF MANUFACTURING HARNESS PART FOR AUTOMOBILE

FIELD OF THE INVENTION

The present invention relates to a method of manufacturing a harness part for an automobile, which is suitable for manufacturing a three-dimensional elongated product such as a wire harness protector.

BACKGROUND OF THE INVENTION

To protect a wire harness, formed for example by bundling a plurality of electric wires onto the body of an automobile, a wire harness protector is employed. The wire harness protector, a three-dimensional compact or product of a resin material, holds the wire harness in a prescribed condition and prevents the wire harness from coming in contact with other parts of the automobile.

Such a wire harness protector can be molded by injection molding according to the shape of the automobile body or a wire harness interconnection path.

However, it is relatively difficult and costly to manufacture a large-sized product having a complicated shape, such as the wire harness protector, by injection molding. Large-scale equipment is required, corresponding to an increase in equipment cost. The design of the metal mold, for a large-sized product, is complicated, with a corresponding increase in the manufacturing cost of the metal mold itself.

On the other hand, numerically controlled (NC) blow molding, a form of resin molding, is advantageously capable of: facilitating three-dimensional molding of an elongated product with a high degree of freedom of design; forming a large-sized product at a low equipment cost, requiring a smaller machine than that employed in injection molding; employing a metal mold with a low manufacturing cost of a zinc alloy or an aluminum alloy with a molding pressure of about 0.5 to 0.7 MPa, i.e., a pressure around 100 times smaller than the pressure in injection molding; and performing precise molding.

NC blow molding has recently been improved, and is capable of suppressing the occurrence of burrs and contributing to the reduction of the manufacturing cost. NC blow molding can control the thickness of a parison by adjusting a clearance between a metal mold and a core for properly changing the thickness of the as-obtained molding without varying the metal mold, thus preventing the occurrence of burrs in a multilayer manner, which contributes to the reduction of the manufacturing cost. NC blow molding molds different materials through a proper combination of resin materials without varying the metal mold, and by using insert molding reduces the number of elements and steps needed.

SUMMARY OF THE INVENTION

According to the present invention, a method of manufacturing a harness part for an automobile comprises an NC blow molding step of molding a hollow compact or product from a resin material and a laser beam machining step, cutting the hollow resin product with a laser beam. The NC blow molding step consists of NC blow molding with a parison which is arranged in a metal mold. The present invention thereby manufactures a solid harness part for an automobile.

Preferably, the harness part is a wire harness protector.

Preferably, the method of manufacturing a harness part for an automobile has an insert step, inserting a mounting member in a prescribed position in the metal mold in advance of the NC blow molding step, so that the mounting member is insert-molded during the NC blow molding step.

Preferably, the mounting member is a clip or a mounting stay.

Preferably, the mounting member is made of the same resin material as the hollow resin product.

Preferably, the mounting member is a hook member for stopping a washer tube, a trunk opener cable or the like.

Preferably, the hollow resin product is partially reduced in thickness by laser beam machining, thereby defining a hinge portion.

Preferably, a portion extending from the hinge portion comprises an openable/closable cover portion.

Preferably, a different material, which is unbondable to the resin material, is co-extruded into the parison in the NC blow molding step in a stripe. This stripe partitions the resin material along the circumferential direction of the parison in correspondence to a separated position of the hollow resin product, thereby molding the hollow resin product.

Preferably, the different material, which is unbondable to the resin material, is a water repellent material.

Preferably, the water repellent material is silicon rubber.

Preferably, the metal mold comprises a concave portion, shaped for an extending portion, in a position of its divided plane. Preferably, the hollow resin product, which is molded in the NC blow molding step, has an extending portion.

Preferably, the metal mold comprises a cope and drag which are so formed as to locate a portion of the hollow resin product which is cut with the laser beam on a position of a divided plane therebetween. The machining step further includes releasing the cope from the drag and opening the cope after the NC blow molding step, so that the hollow resin product which is left in the drag is cut with the laser beam along the cut portion. The hollow resin product is then taken out from a form block of the drag and the remaining cut portion is thereafter machined with the laser beam, thereby manufacturing a solid harness part for an automobile.

According to the present invention, a hollow resin product which is molded by NC blow molding, in a three-dimensional manner, in response to a target shape of a harness part for an automobile.

Then, a prescribed position of the as-formed hollow resin product is machined with a laser beam to cut unnecessary portions, thus manufacturing a harness part for an automobile as a solid product.

Since laser beam machining is employed to machine the hollow resin product, three-dimensional working can be easily executed to attain excellent productivity.

If a mounting member such as a clip is insert-molded when the hollow resin product is formed by the aforementioned NC blow molding, a step of mounting the mounting member is no longer necessary, thereby increasing efficiency.

When the as-molded hollow resin product is cut with a laser beam, further, it is possible to easily form a swingable portion by thinly laser beam machining a part of the hollow resin product thereby forming a hinge portion.

Further, a different material, unbondable to the resin material may be mixed into the parison in NC blow molding in a stripe. This stripe partitions the resin material along the circumferential direction of the parison in correspondence to a separated position of the hollow resin product, molding the hollow resin product. This makes it possible to omit processing for cutting the separated position after molding of the hollow resin product, thereby increasing efficiency.

When NC blow molding is performed by a metal mold for NC blow molding which is provided with a concave portion for an extending portion in a position of a divided plane for forming a hollow resin product having an extending portion, it is possible to utilize the extending portion as a mounting portion, thereby rendering a step of mounting the mounting portion unnecessary, increasing efficiency.

According to the inventive method of manufacturing a harness for an automobile, as hereinabove described, a resin material is employed to form a hollow resin product by NC blow molding. The as-formed hollow resin product is then cut with a laser beam to manufacture a solid harness part for an automobile. It is possible to effectuate advantages of NC blow molding to reduce the manufacturing cost for the solid harness part for an automobile, while laser beam machining is employed so three-dimensional working can be easily executed to ensure excellent productivity.

Accordingly, an object of the present invention is to provide a method of manufacturing a harness part for an automobile which can reduce the manufacturing cost with excellent productivity, by combining NC blow molding, suitable for molding of a three-dimensional elongated product, with laser beam machining.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
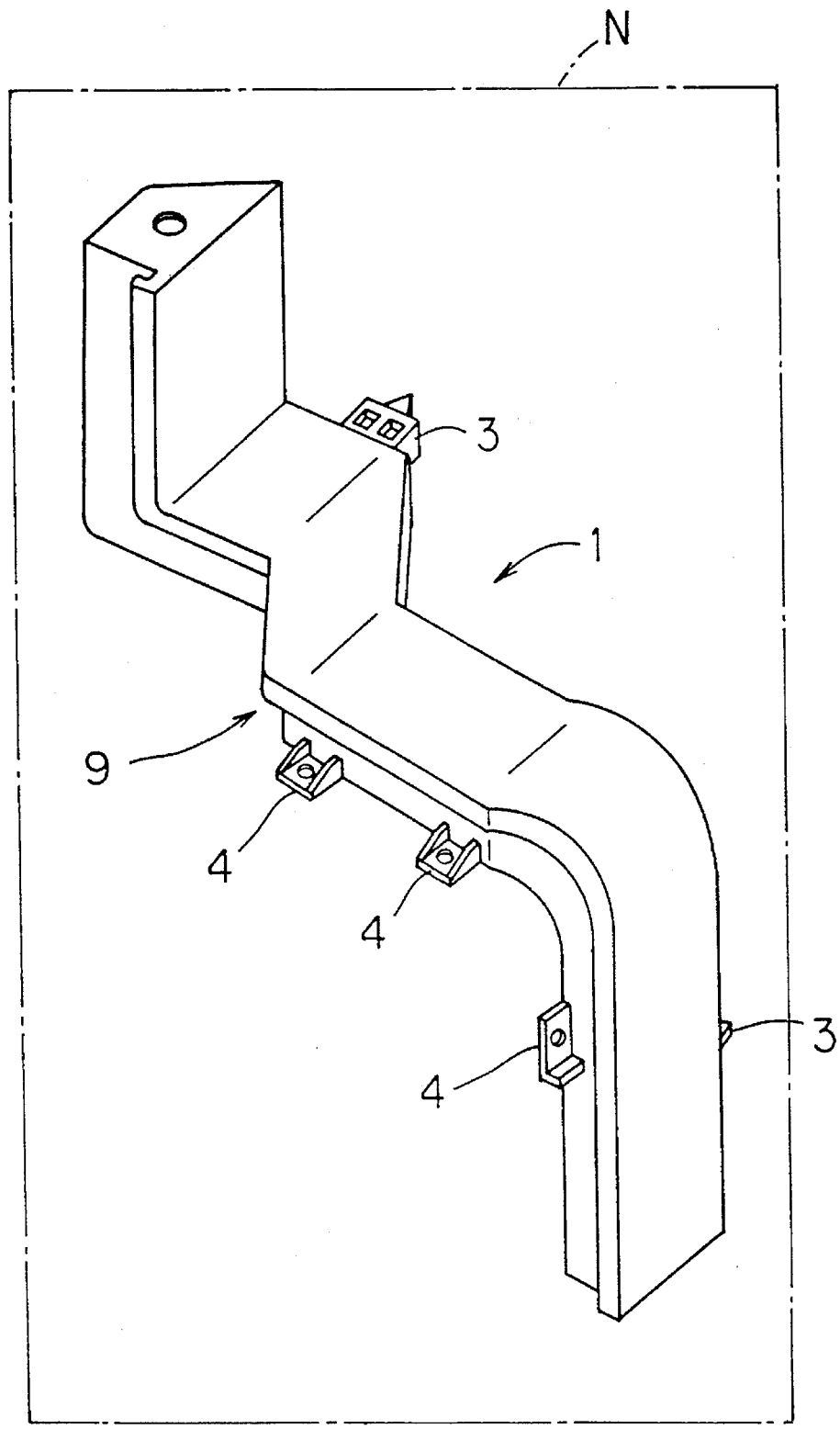
FIG. 1A is a perspective view schematically showing an NC blow molding step in an embodiment of the present invention.
Figure 1B:
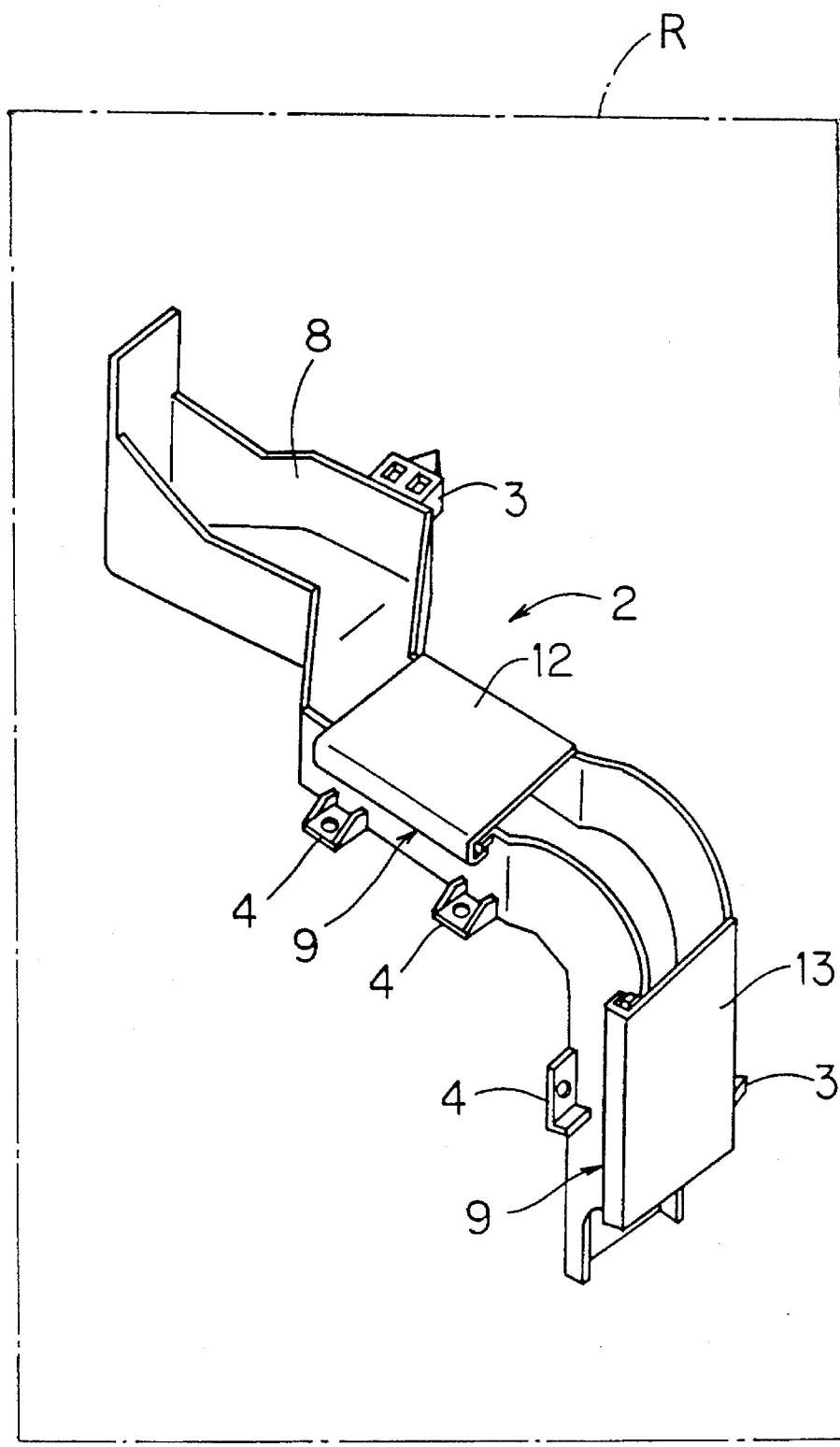
FIG. 1B is a perspective view schematically showing a laser beam machining step in the embodiment of the present invention.

An embodiment of the present invention is now described with reference to the drawings. FIG. 1A is a perspective view showing a hollow compact or resin product 1 which is formed by an NC blow molding machine N in an NC blow molding step, and FIG. 1B is a perspective view showing a wire harness protector 2, which is a solid three-dimensional resin product obtained by cutting the hollow resin product 1 with a laser beam machine R in a laser beam machining step.

Resin employed for such molding is prepared from a resin material, which is engineering plastics serving as a structural material suitable for blow molding and having a black or gray tone in view of machinability with a laser beam. Table 1 shows examples of such a resin material.

Referring to Table 1, the heat-resistant ABS resin (heat-resistant acrylonitrile-butadiene-styrene resin) is prepared from a copolymer of maleic acid and nylon ABS, for example. The PBT blow grade (polybutylene terephthalate blow grade) is prepared from a polymer alloy of PBT and olefin, or engineering plastics such as polymer-alloy of both olefin and Nylon-6, for example.

TABLE 1

|  | Heat-Resistant ABS Resin | Polycaprolactam Blow Grade | PBT Blow Grade | Polypropylene |
|---|---|---|---|---|
| Flexural Strength (kg/cm$^2$) | 680 | 400 | 780 | 320 |
| Flexural Elasticity (Kg/cm$^2$) | 18000 | 8000 | 23000 | 10500 |
| Izod Impact Value (Kg · cm/cm) | 12 | >50 | 5.4 | 4.0 |
| Thermal Deformation Temperature (°C.) [4.6 Kg/cm$^2$] | 147 | 182 | 163 | 115 |

The NC blow molding machine N is formed by an NC horizontal parison blow molding machine, comprising for example an in-line screw unit, an X/Y/Z axis driving part and an NC unit. The laser beam machine R is formed by an articulated robot system employing for example a YAG laser.

Figure 1C:
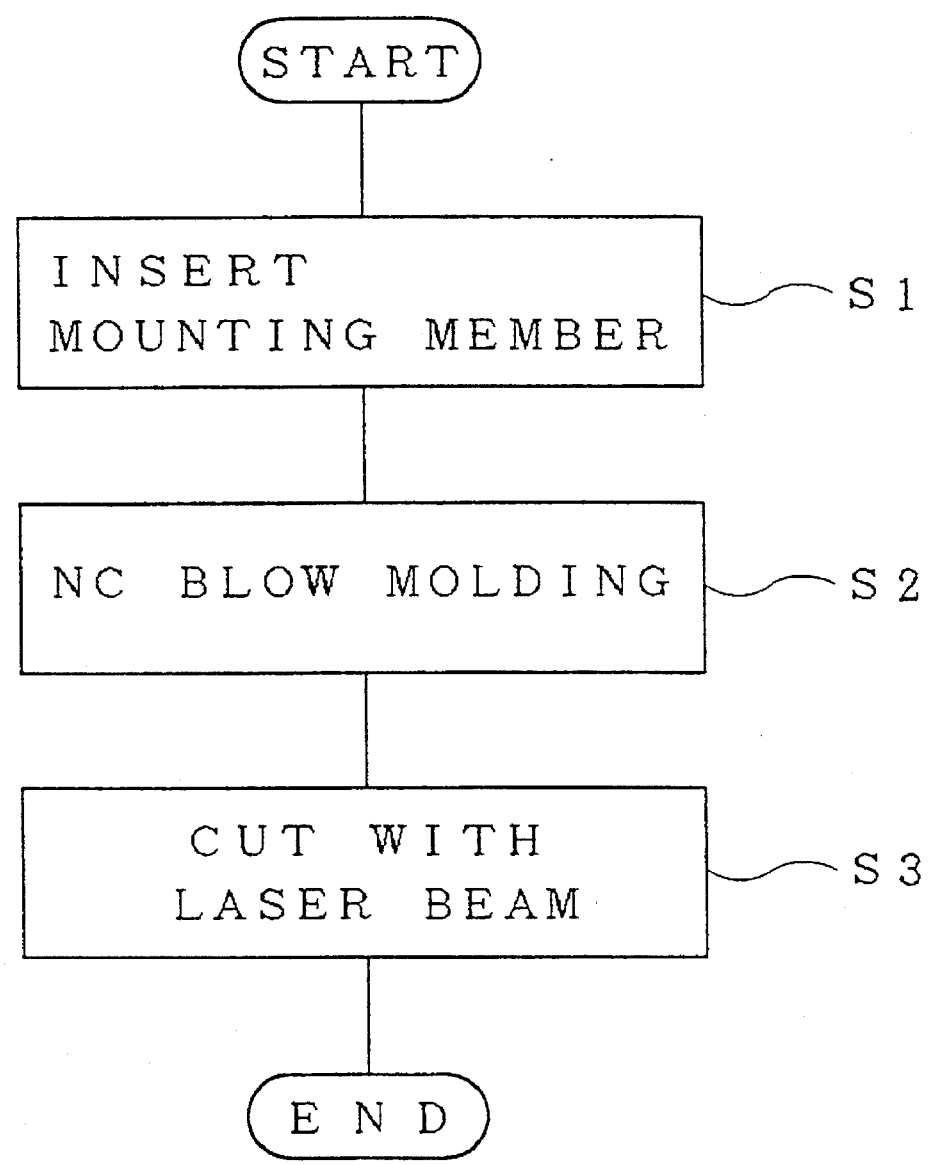
FIG. 1C is a flow chart showing manufacturing steps in the embodiment of the present invention.
Figure 2:
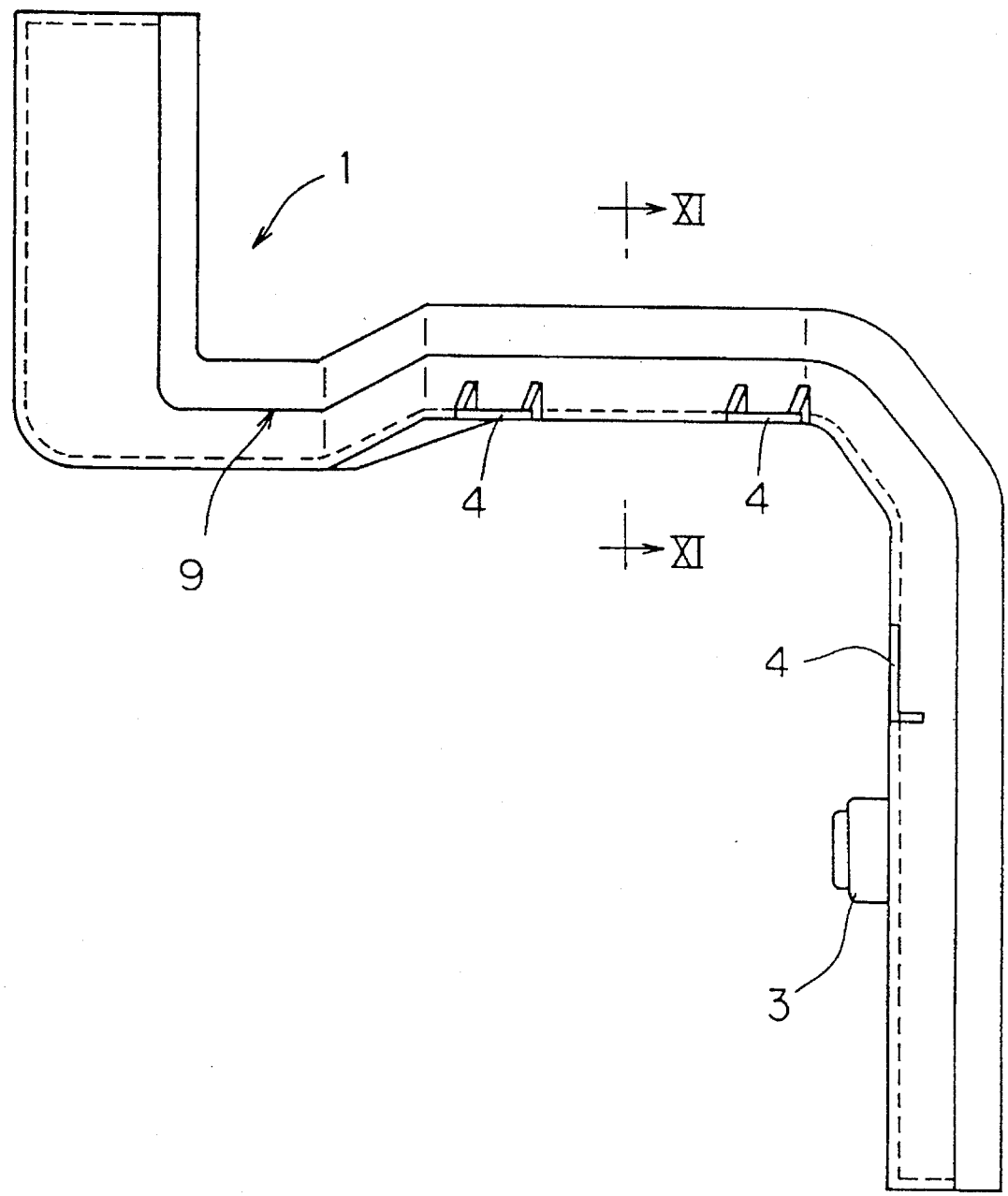
FIG. 2 is a front elevational view showing a hollow compact or resin product.
Figure 3:
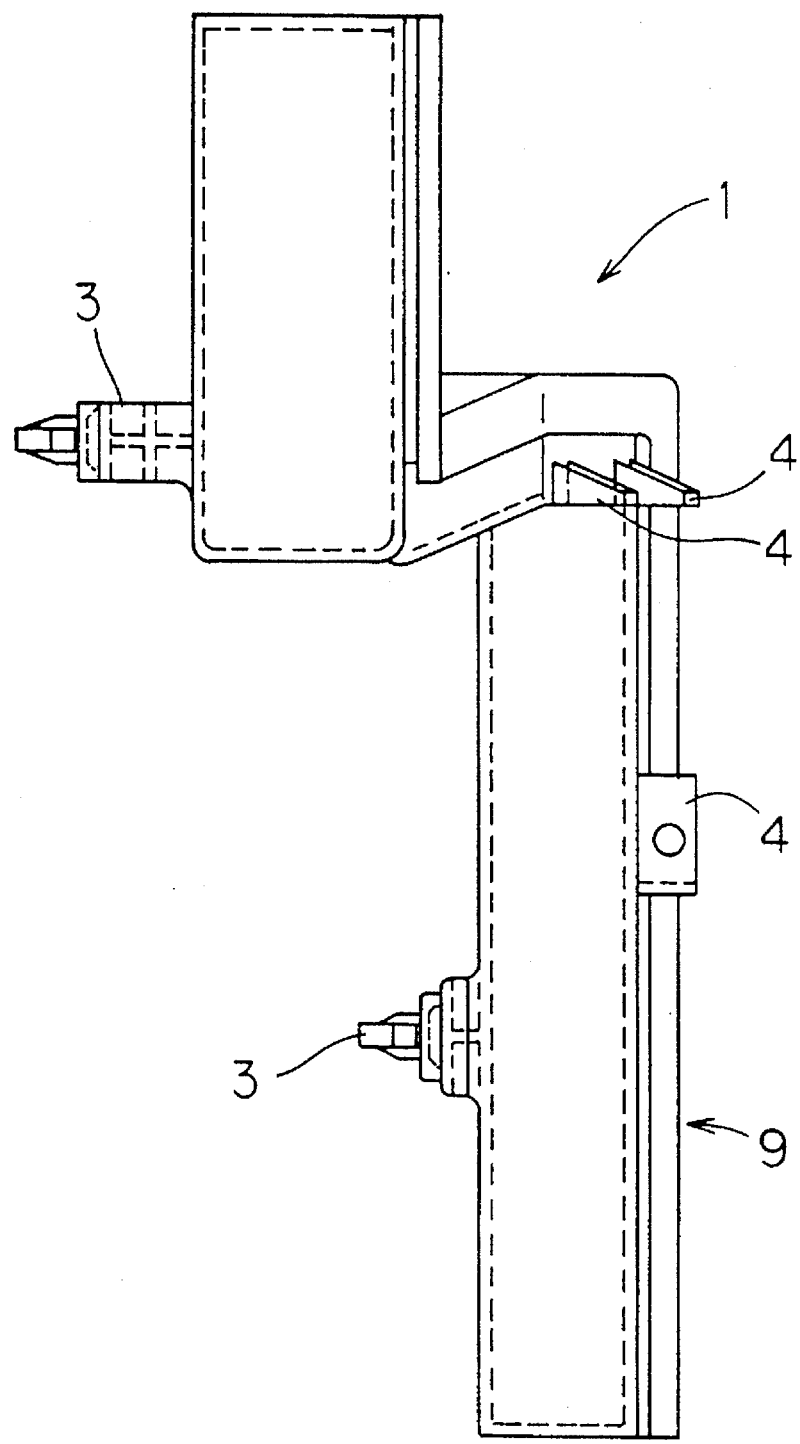
FIG. 3 is a left side elevational view of the hollow compact shown in FIG. 2.
Figure 4:
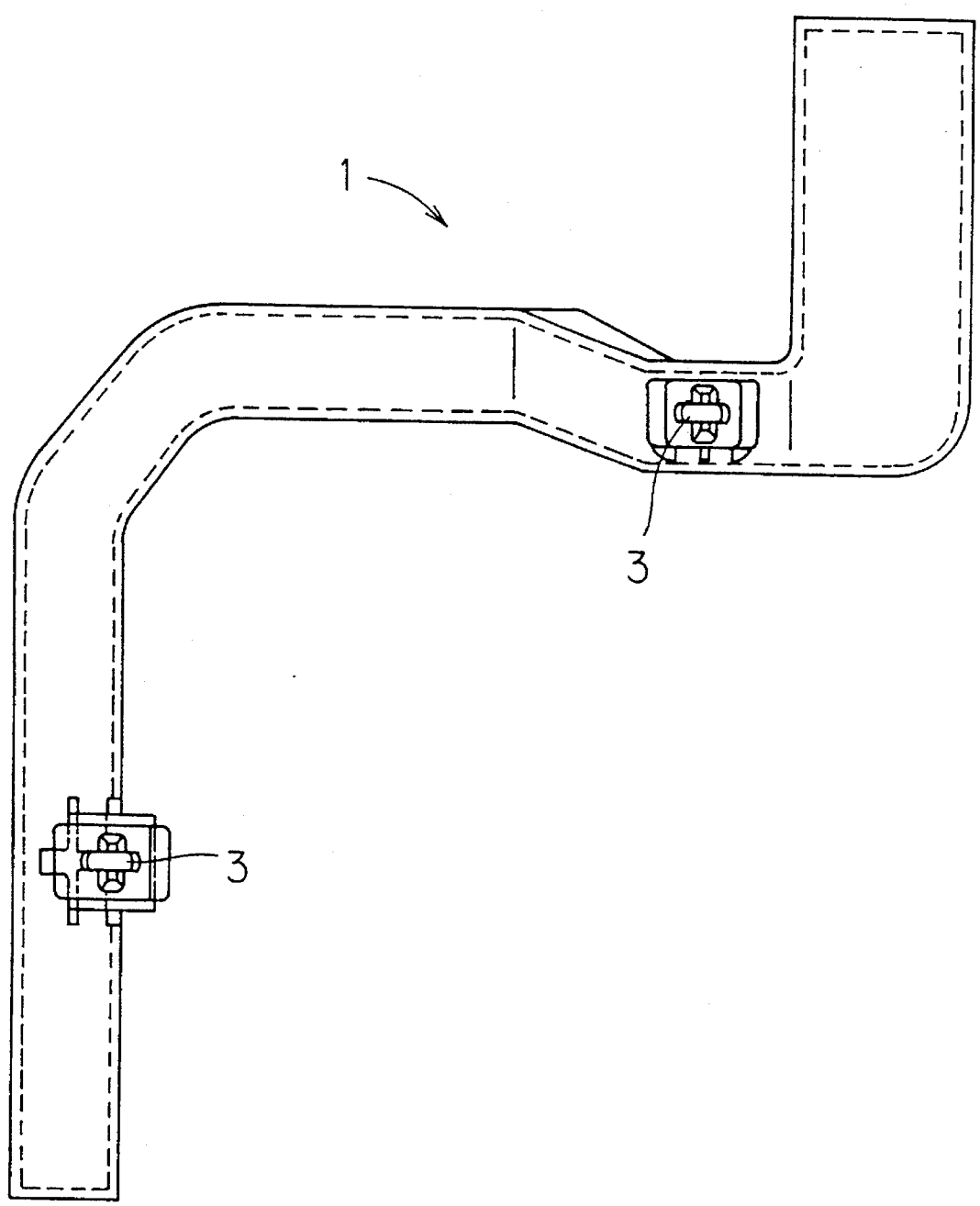
FIG. 4 is a rear elevational view of the hollow compact shown in FIG. 2.
Figure 5:
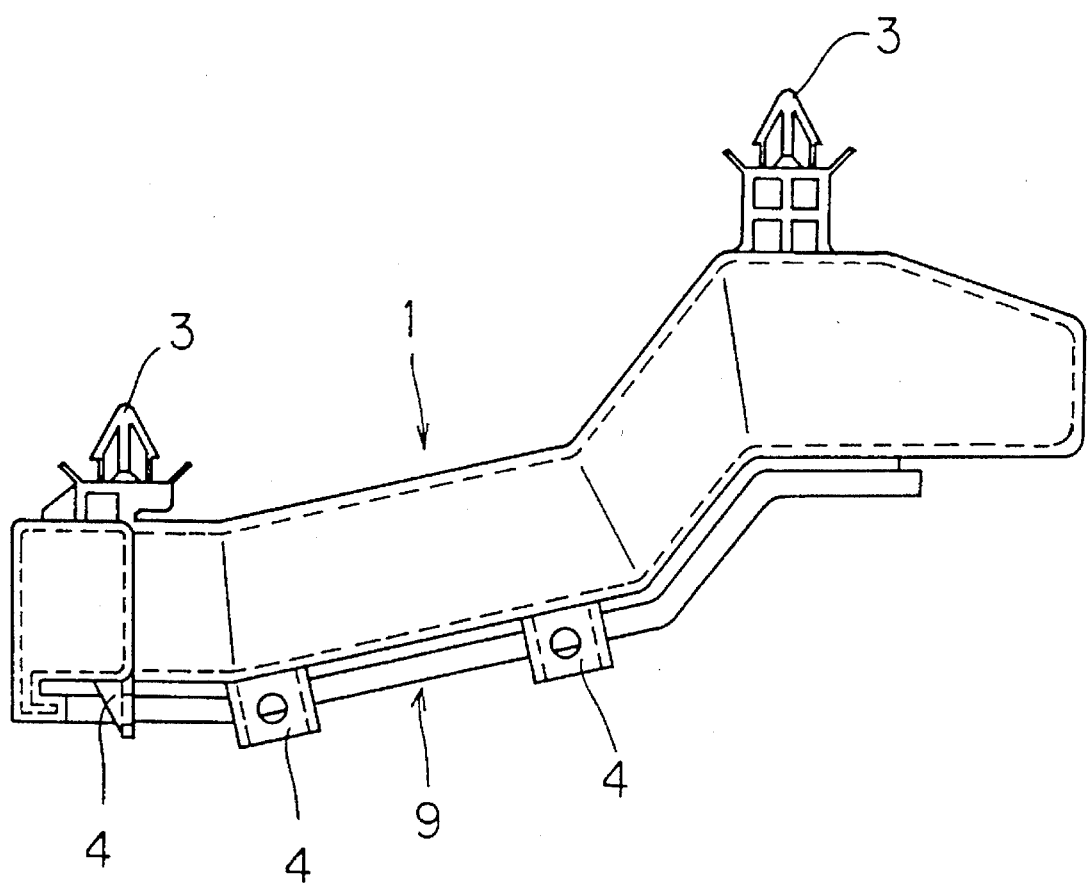
FIG. 5 is a bottom plan view of the hollow compact shown in FIG. 4.
Figure 6:
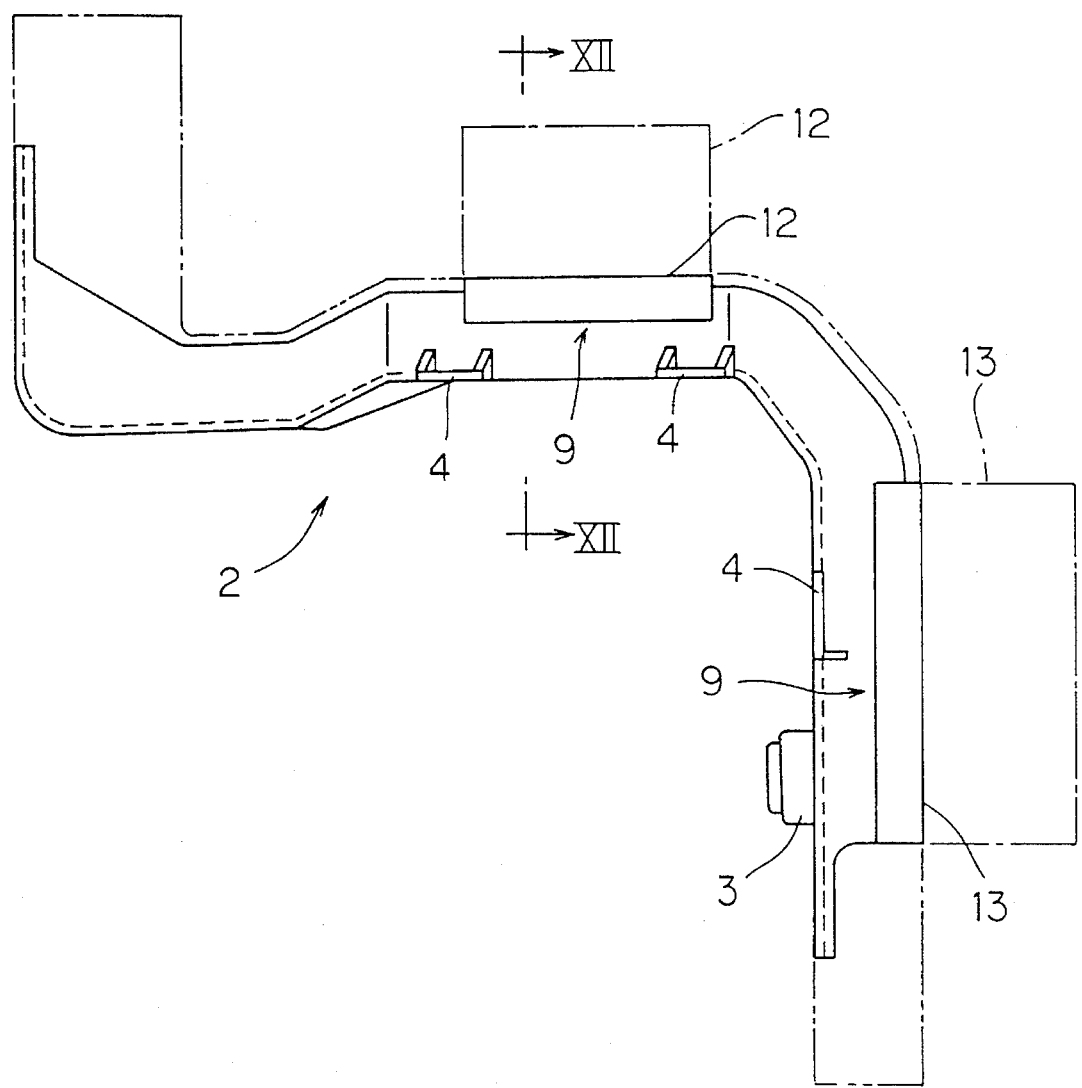
FIG. 6 is a front elevational view showing a wire harness protector.
Figure 7:
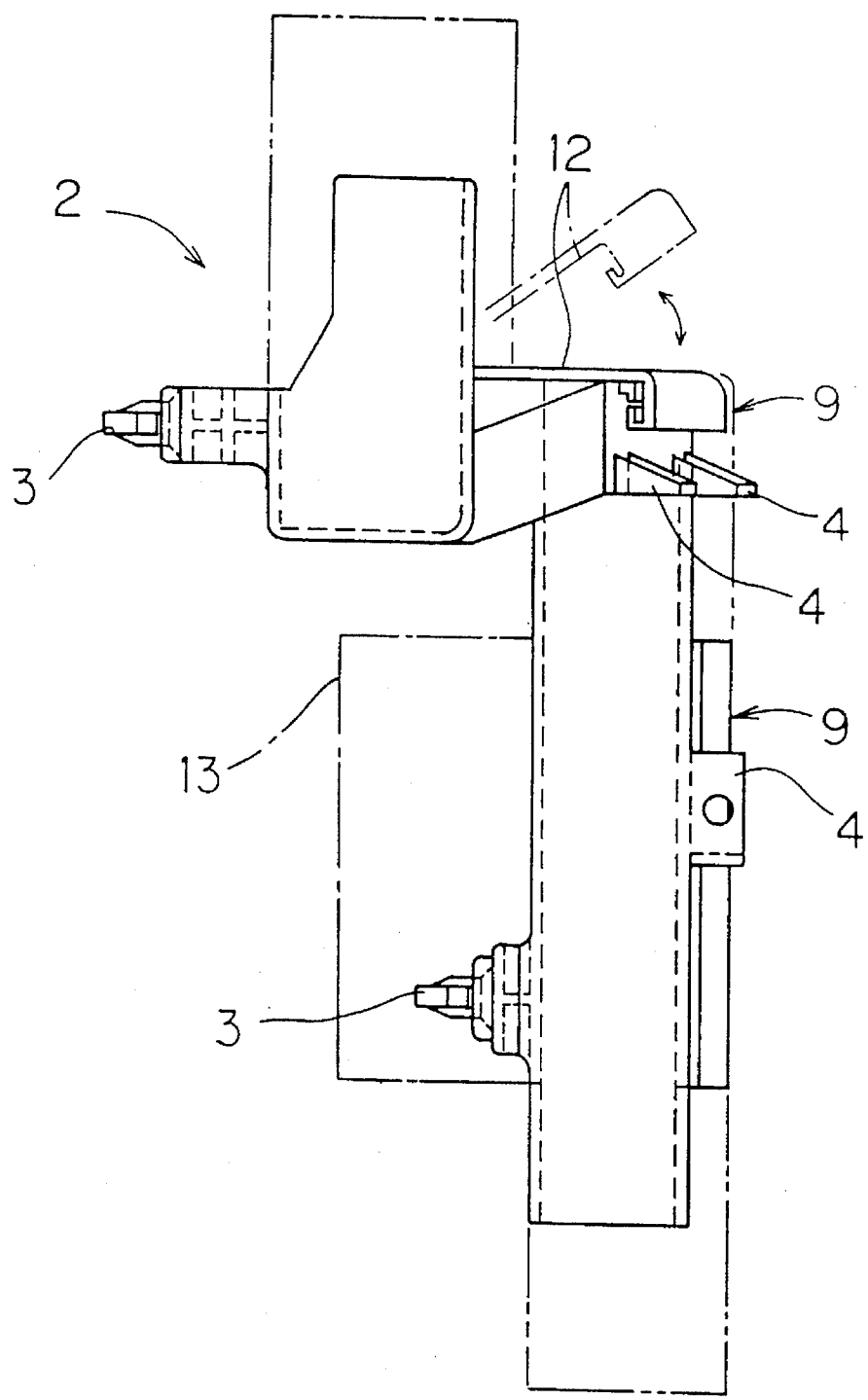
FIG. 7 is a left side elevational view of the wire harness protector shown in FIG. 6.
Figure 8:
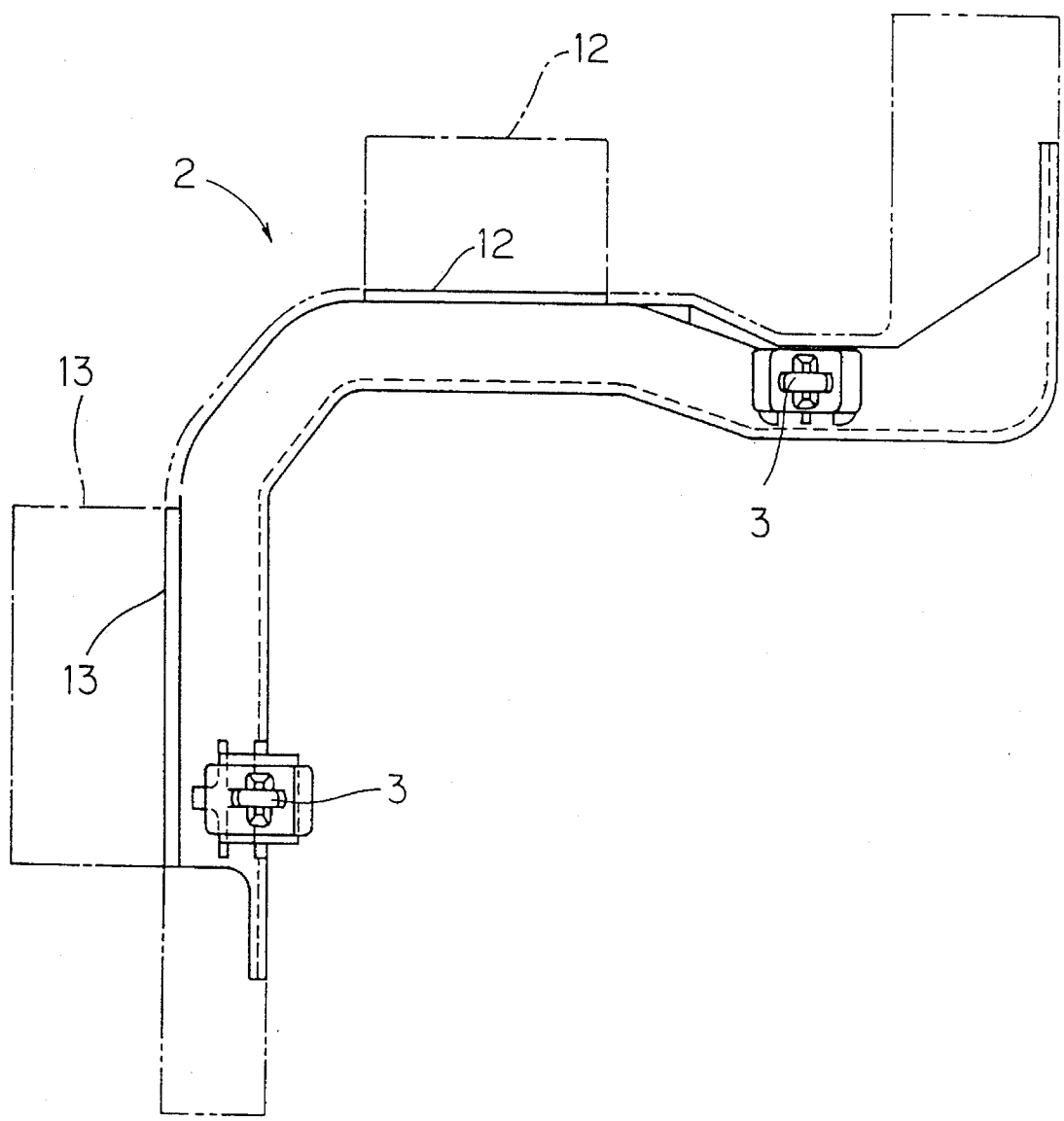
FIG. 8 is a rear elevational view of the wire harness protector shown in FIG. 6.
Figure 9:
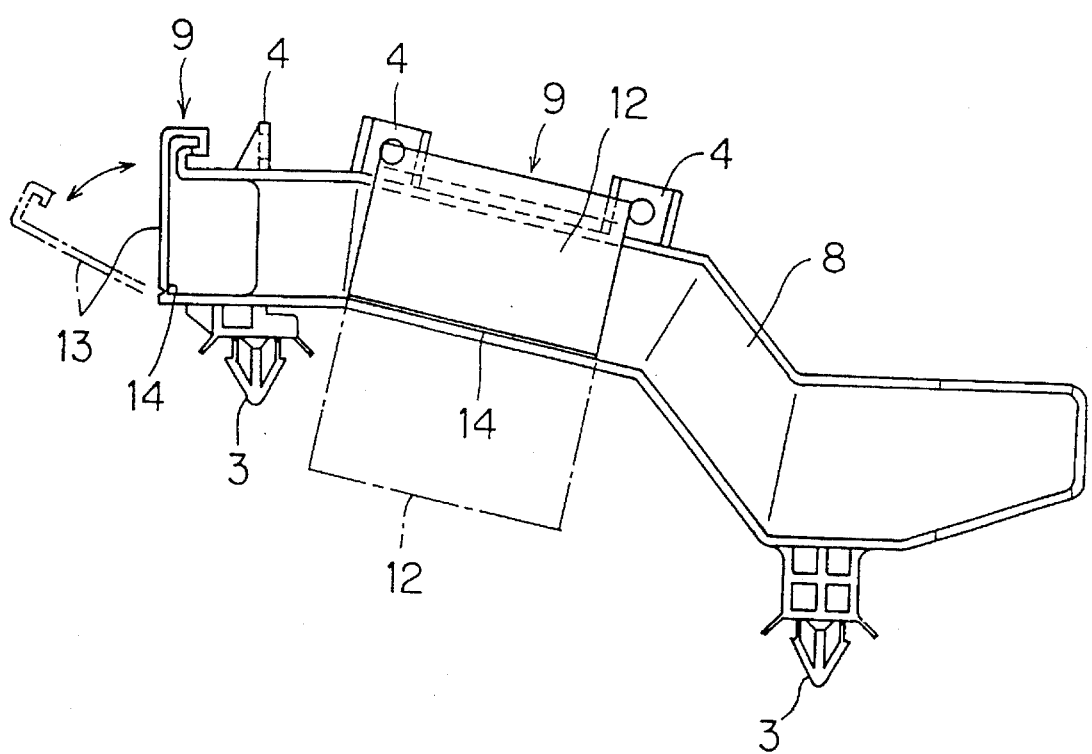
FIG. 9 is a plan view of the wire harness protector shown in FIG. 8.
Figure 10:
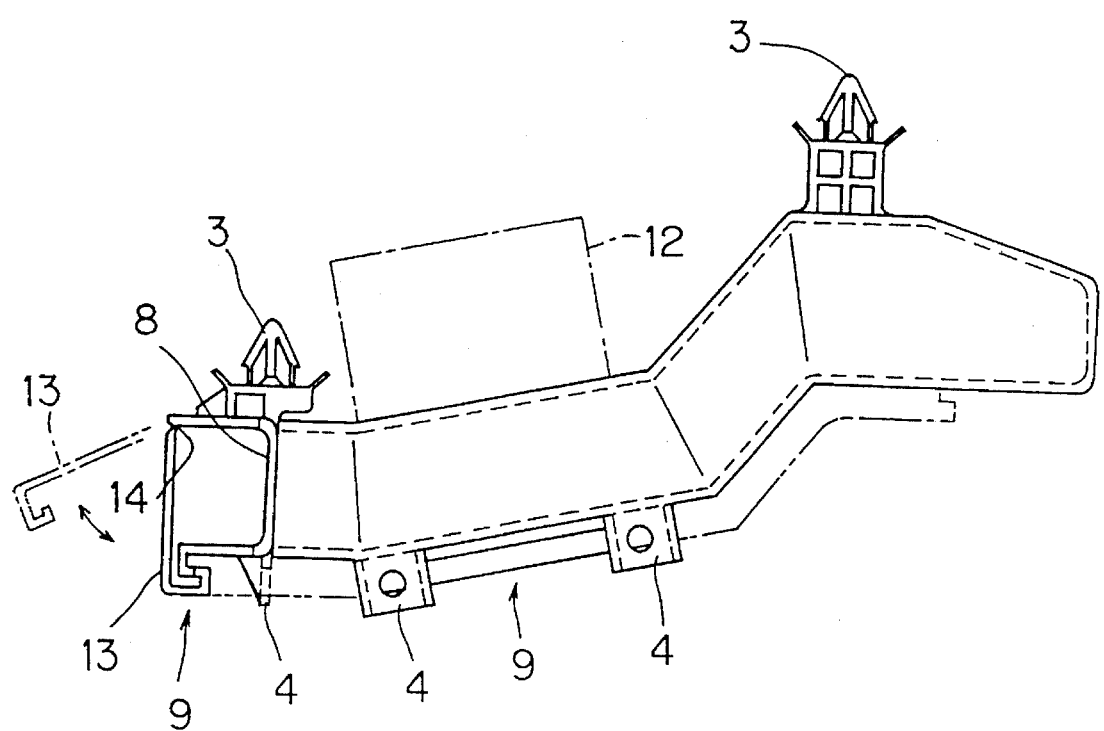
FIG. 10 is a bottom plan view of the wire harness protector shown in FIG. 8.

As shown in a flow chart of FIG. 1C, clips 3 and mounting stays 4, appearing in FIGS. 1A, 1B and 2 to 10, serving as mounting members are first inserted in prescribed positions of a metal mold in the NC blow molding machine N at a step S1 (insert step). A parison is then arranged in a form block of a drag at a step S2, a cope is clamped on the drag and air is then supplied into the parison from a prescribed air supply hole (FIG. 1A). This process forms a hollow compact or resin product 1 which is then bent into the three-dimensional form of a rectangular cylinder in response to a wire harness protector 2 shown in FIGS. 2 to 5 (NC blow molding step).

Figure 11:
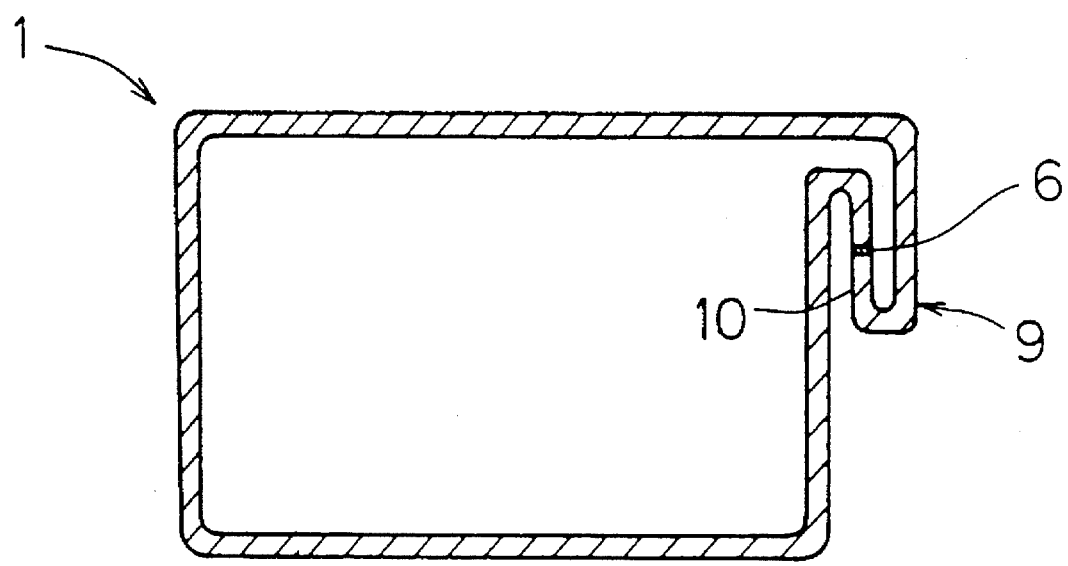
FIG. 11 is a sectional view taken along the line XI—XI in FIG. 2.

In arrangement of such a parison, a different material which is unbondable to the resin material, e.g., a water repellent material (low surface energy material) such as silicon rubber 6, is co-extruded into the parison in the form of a stripe for partitioning the resin material along the circumferential direction of the parison in correspondence to a separated position of the hollow resin product 1 to be formed for performing NC blow molding, as shown in FIG. 11.

Further, the above clips 3 and mounting stays 4 are made of a resin material of the same type as that of the hollow resin product 1, and are to be integrated with the hollow resin product 1.

The cope and the drag are then opened at a step S3 to take out the as-formed hollow resin product 1, which in turn is cut with the laser beam machine R to remove unnecessary portions as shown by two-dot chain lines in FIGS. 6 to 10, thereby manufacturing the wire harness protector 2, which is substantially U-shaped in section, having a wire harness storage cavity 8 along its longitudinal direction, as shown by solid lines in FIGS. 6 to 10 (laser beam machining step).

Figure 12:
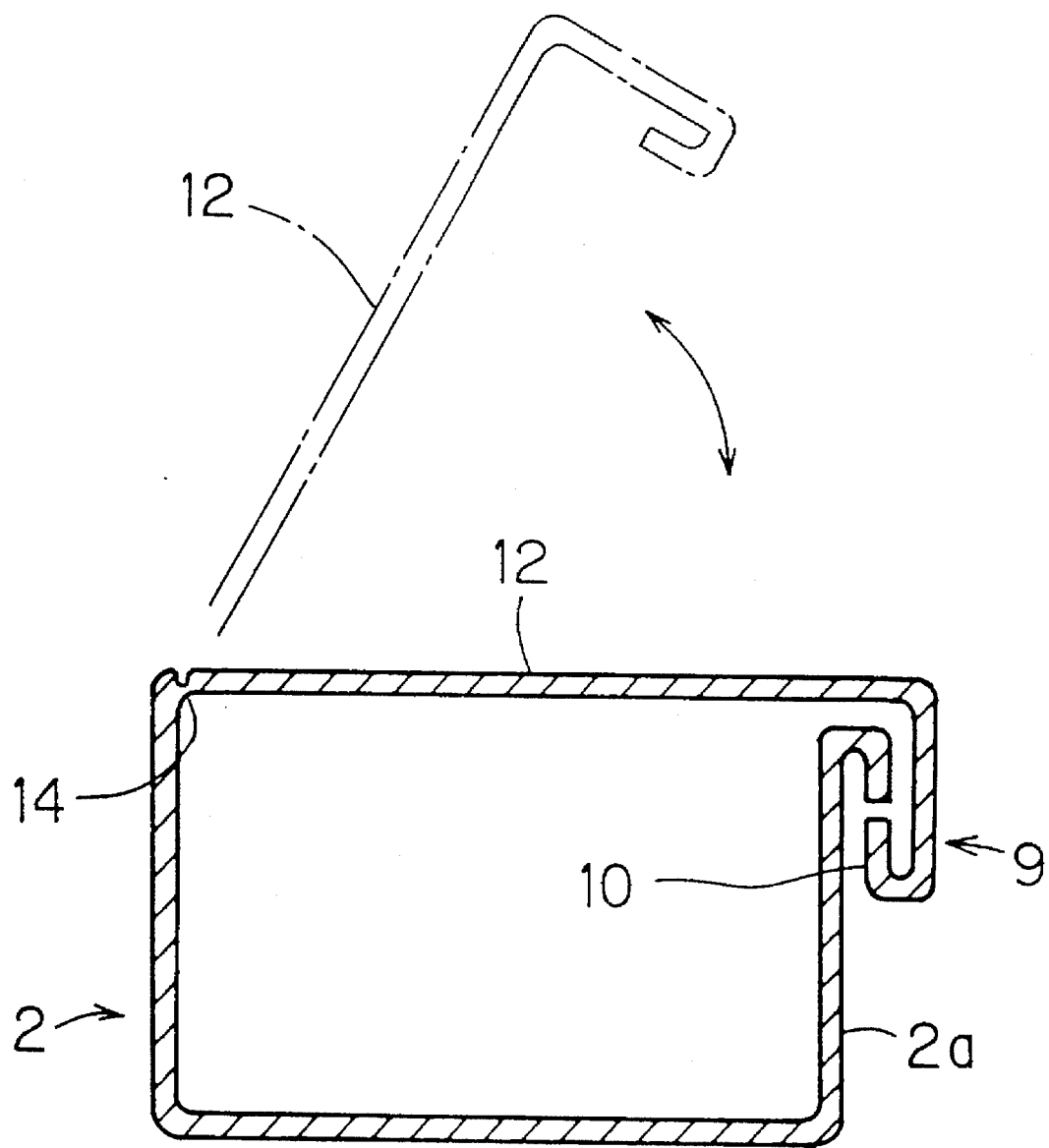
FIG. 12 is a sectional view taken along the line XII—XII in FIG. 6.

In this case, the aforementioned silicon rubber 6 is formed to be arranged in a vertical intermediate position of an inner wall portion 10 of a suspended extending portion 9 having a substantially U-shaped section. The suspended extruding portion 9 is made to extend on one side of the as-formed hollow resin product 1 as shown in FIG. 11, whereby the inner wall portion 10 of the suspended extending portion 9 is vertically separated along its longitudinal direction when the silicon rubber 6 is removed after molding of the hollow resin product 1, as shown in FIG. 12. Thus, it is possible to partially omit the processing of cutting with a laser beam at this position.

Figure 13:
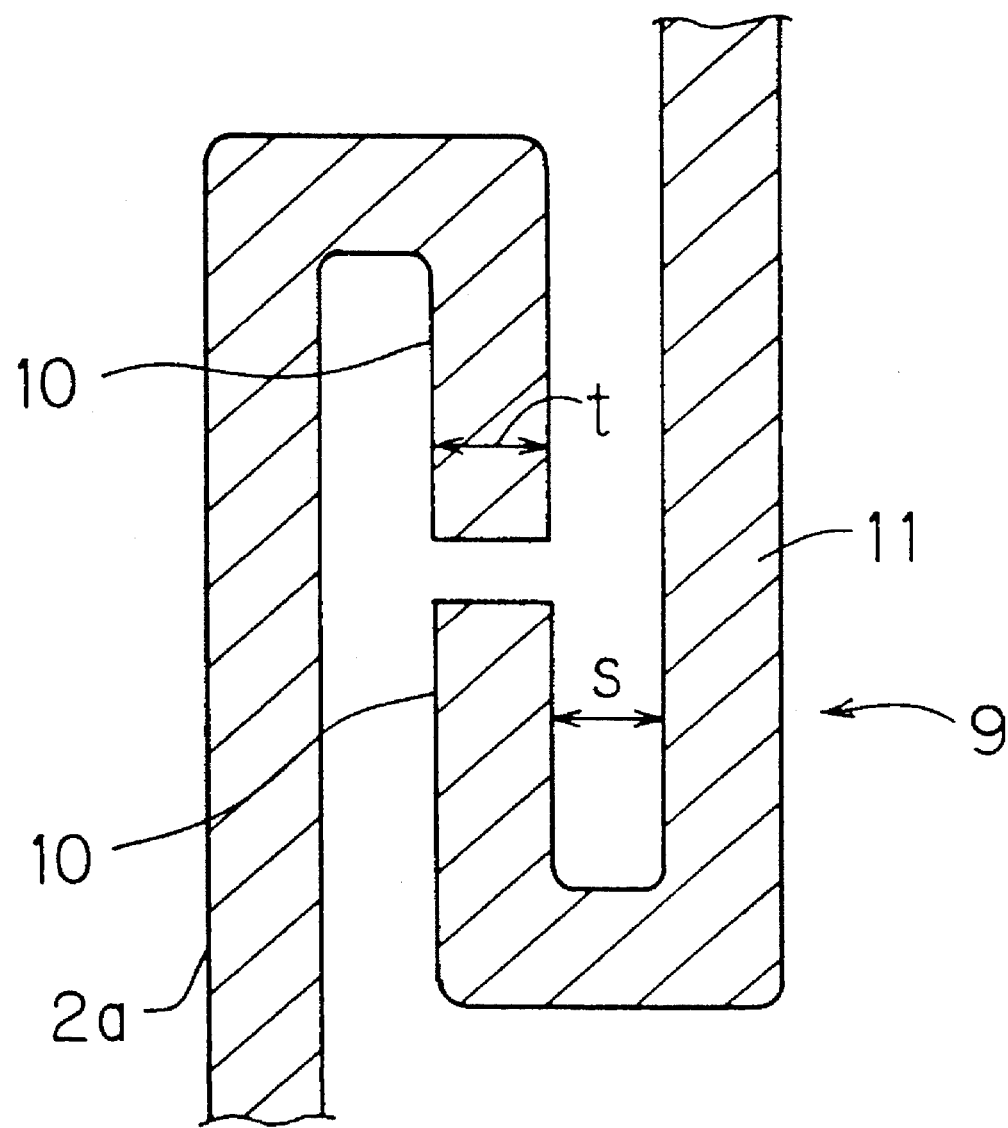
FIG. 13 is a partially enlarged view of the wire harness protector shown in FIG. 12.

As shown in FIG. 13, further, a clearance S between the inner wall portion 10 and an outer wall portion 11 of the suspended extending portion 9 is formed to be substantially identical to or slightly narrower than a thickness t of the inner wall portion 10.

As shown in FIGS. 1B and 6 to 10, regulating cover portions 12 and 13 having proper lengths are left on upper and side portions of an open side edge of the wire harness storage cavity 8 which is provided in the wire harness protector 2.

Edges of the regulating cover portions 12 and 13 which are opposite to the suspended extending portion 9 are machined with the laser beam into thin coupling members 14 serving as hinge portions, substantially halves of which are cut with the laser beam along the direction of thickness. The regulating cover portions 12 and 13 are formed to be openable about the positions of the thin coupling members 14, as shown by one-dot chain lines in FIGS. 6 to 10 and 12.

Figure 14:
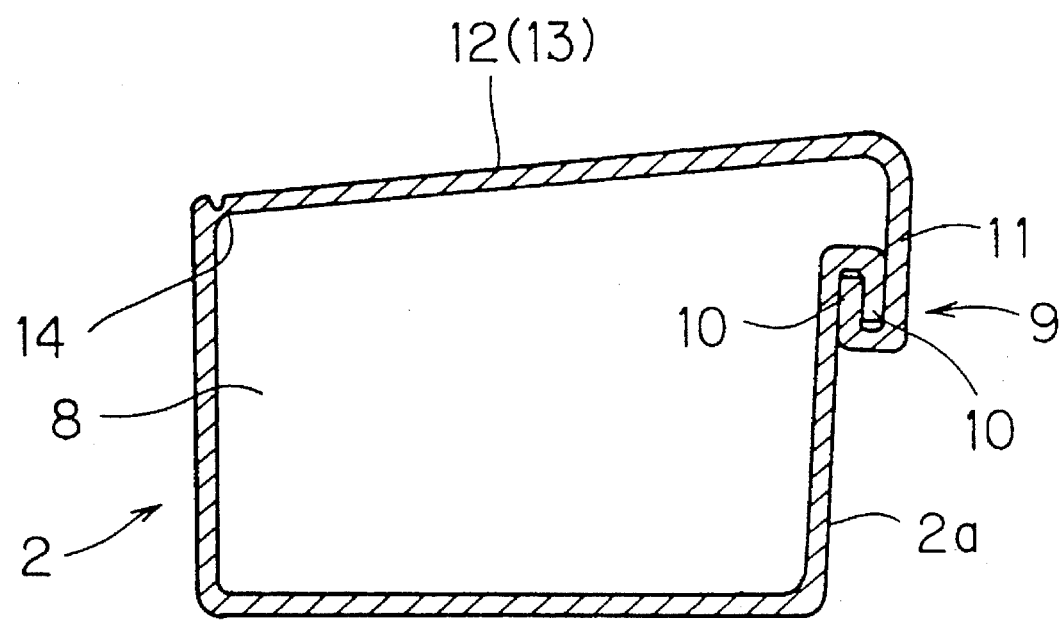
FIG. 14 is a sectional view showing a locked state of a regulating cover portion.

In order to use the wire harness protector 2, the regulating cover portions 12 and 13 are temporarily opened to store a wire harness in the wire harness storage cavity 8 along its longitudinal direction. Thereafter the regulating cover portions 12 and 13 are closed and a part of the inner wall portion 10 which is left on a wall portion 2a side of the wire harness protector 2 is fitted in the clearance S between the inner wall portion 10 and the outer wall portion 11 of the suspended extending portion 9 located on the side of the regulating cover portions 12 and 13 as shown in FIG. 14, whereby a locked state is maintained by mutual elastic friction. Then, the wire harness protector 2 may be mounted on a prescribed position of the body of an automobile through the respective clips 3 and the respective mounting stays 4 which are integrally provided on the same. At this time, the wire harness is effectively prevented from removal from the wire harness storage cavity 8 by the respective regulating cover portions 12 and 13.

In the method of manufacturing the wire harness protector 2 according to the embodiment of the present invention, the wire harness protector 2 is not directly molded by injection molding or a similar method, but the hollow resin product 1 is temporarily molded by NC blow molding into a shape which is responsive to the wire harness protector 2 and thereafter cut with a laser beam, to manufacture the solid wire harness protector 2 having a target shape. Thus, it is possible to effectuate the advantages of NC blow molding, which is capable of facilitating three-dimensional molding of an elongated product with a high degree of freedom of design, and forming a large-sized product through a smaller machine as compared with that in injection molding, thus reducing the equipment cost.

Further, a molding pressure which is applied to the metal mold is remarkably lower than that applied in injection molding, so it becomes possible to employ a metal mold of a zinc alloy or an aluminum alloy. This then reduces the cost of manufacturing the metal mold itself, reducing manufacturing costs. Particularly in relation to a three-dimensional resin product of resin material which is manufactured in a relatively small quantity, the advantages of reducing the manufacturing cost are high, when compared with injection molding.

According to the NC blow molding, further, it is possible to form a product in a small thickness substantially without regard to a resin flow in the metal mold dissimilarly to the injection molding, thereby reducing the weight of the wire harness protector. In addition, excellent heat resistance can be attained due to the engineering plastics.

Since the molding material is prepared from a resin material having a black or gray tone, it is possible to smoothly cut the hollow resin product 1 with a laser beam in a short time with excellent absorption of the laser beam. Further, complicated three-dimensional cutting can be facilitated by employment of the articulated robot system, thereby ensuring excellent productivity.

Since the clips 3 and the mounting stays 4 are insert-molded when the hollow resin product 1 is formed by NC blow molding, the step of mounting the mounting members can be reduced to increase efficiency.

Figure 15:
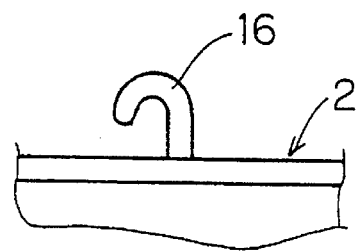
FIG. 15 is an enlarged view showing a principal part of another embodiment of the present invention.

As shown in FIG. 15, a hook member 16 for stopping a washer tube or a trunk opener cable may be insert-molded on an outer side surface of a wire harness protector 2, or another member such as a flange portion or a rib may be insert-molded.

Further, the as-formed hollow resin product is machined in small thicknesses to form the thin coupling members 14 with the laser beam when the same is cut with the laser beam, whereby the regulating cover portions 12 and 13 can be easily opened/closed. In addition, the suspended extending portion 9 can be utilized as a locking mechanism for the regulating cover portions 12 and 13, whereby it is not necessary to separately provide a fixing member for regulating an operation for opening the regulating cover portions 12 and 13.

Further, it is possible to omit processing for cutting the separated position of the hollow resin product 1 after molding of the hollow resin product 1 by forming the hollow resin product 1 while co-extruding the silicon rubber 6 into the parison in NC blow molding in the form of a stripe for partitioning the resin material along the circumferential direction of the parison in correspondence to the separated position, thereby increasing efficiency.

Figure 16:
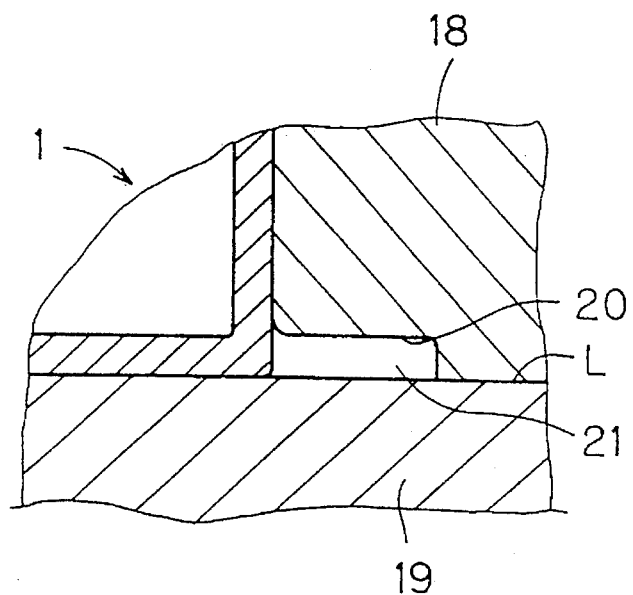
FIG. 16 is an enlarged view showing a principal part of still another embodiment of the present invention.

As shown in FIG. 16, a concave portion 20 for an extending portion may be formed in a position of a divided plane L between a cope 18 and a drag 19 of an NC blow molding machine to form a hollow resin product 1 having an extending portion 21 by NC blow molding, thereby utilizing the extending portion 21 as a mounting portion. In this case, it is not necessary to have a step of mounting a mounting portion, thereby increasing efficiency.

Figure 17:
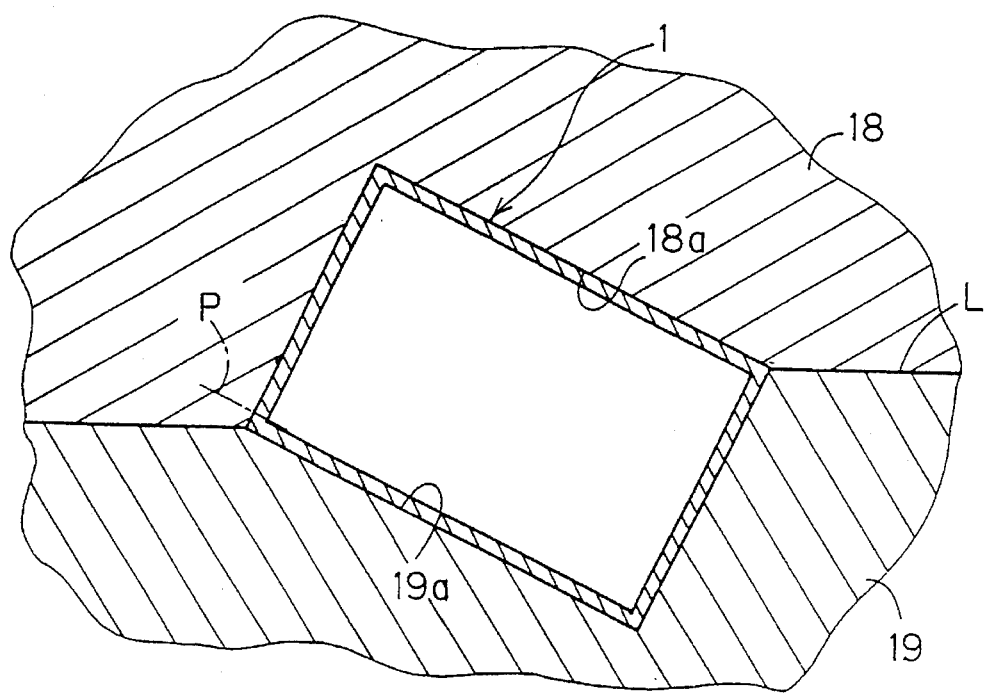
FIG. 17 is a partially fragmented sectional view showing a further embodiment of the present invention in NC blow molding.

Respective form blocks 18a and 19a are designed so that a portion P to be cut with a laser beam is located on a position of a divided plane L between a cope 18 and a drag 19. As shown in FIG. 17, a hollow resin product 1 is previously cut with a laser beam along one cut portion P along the divided plane L in such a state that the hollow resin product 1 is left in the drag 19. After such cutting, the hollow resin product 1 is taken out from the form block 19a of the drag 19 so that a remaining cut portion is machined with the laser beam to remove unnecessary portions, thereby manufacturing a wire harness protector 2 having a prescribed shape. In this case, positioning in laser beam machining is facilitated in cutting with a laser beam along the one cut portion P, thereby attaining improvement in productivity.

Figure 18:
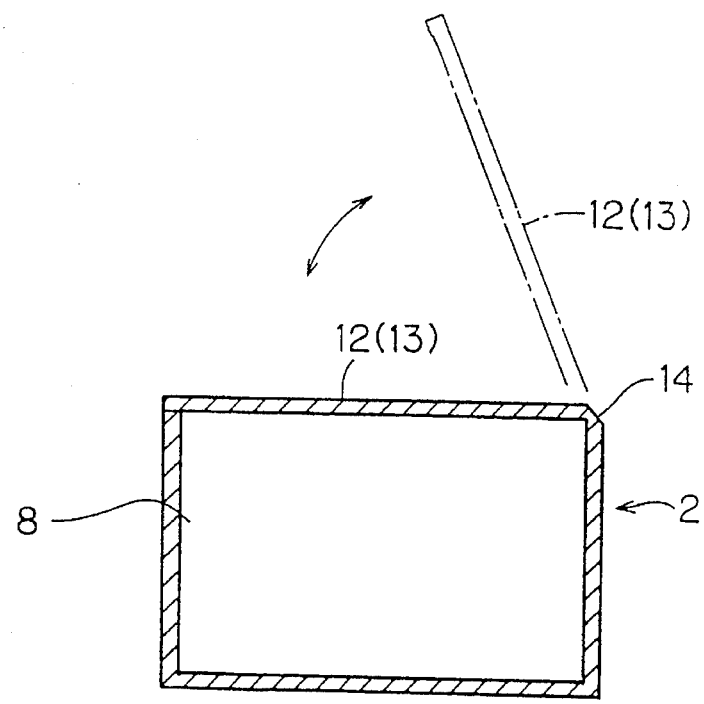
FIG. 18 is a partially fragmented sectional view showing a further embodiment of the present invention.

While substantially half portions of the thin coupling members 14 are cut with the laser beam along the direction of thickness in preparation thereof in the aforementioned embodiment, a corner portion on a second edge of a regulating cover portion 12 or 13 may alternatively be cut with a laser beam to form a thin coupling member 14, so that the regulating cover portion 12 or 13 is opened/closed about this thin coupling member 14, as shown in FIG. 18.

Figure 19:
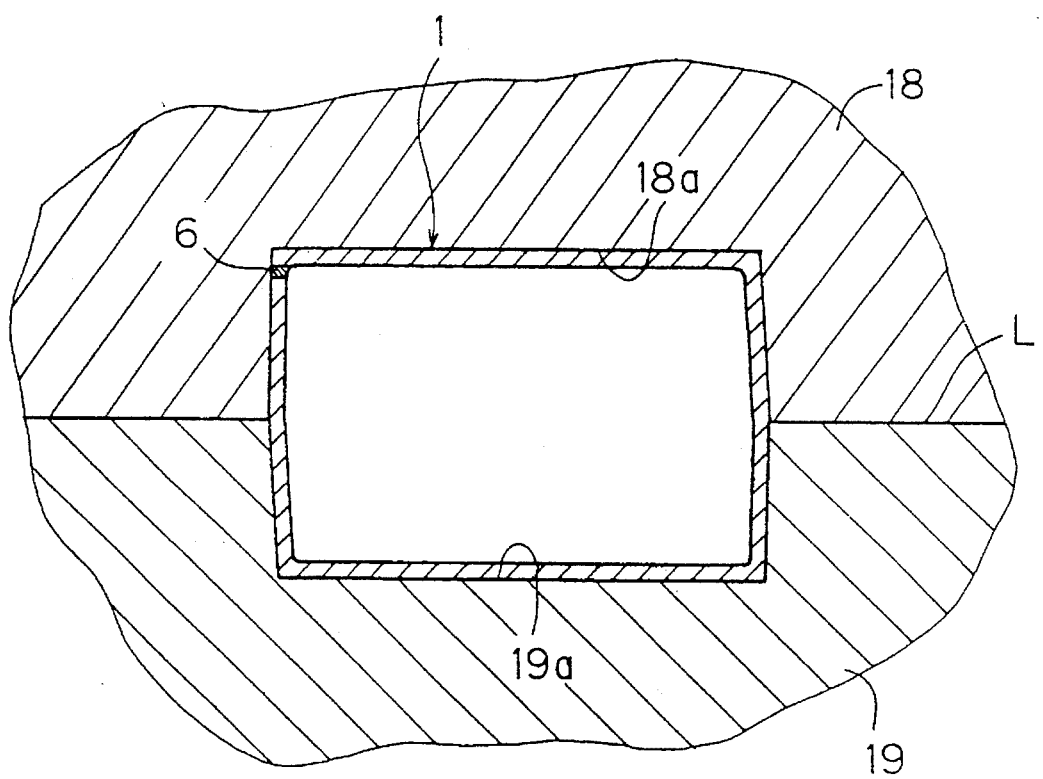
FIG. 19 is a partially fragmented sectional view showing a further embodiment of the present invention in NC blow molding.

While the respective form blocks 18a and 19a are designed so that the portion P which is cut with the laser beam is located on the divided plane L of the cope 18 and the drag 19, further, form blocks 18a and 19a may alternatively be formed so that no cut portion P is located on a divided plane L of a cope 18 and a drag 19, as shown in FIG. 19. Then, silicon rubber 6 or the like may be co-extruded into a parison in correspondence to a separated position.

While a different material such as the silicon rubber 6 is co-extruded into the parison in correspondence to the separated position of the hollow resin product 1, stripe-shaped projections may be arranged on positions of the form blocks 18a and 19a of the cope 18 and the drag 19 corresponding to the separated position of the hollow resin product 1 so that the projections are previously coated with a water repellent material such as the silicon rubber 6, to carry out NC blow molding. Also in this case, it is possible to obtain the hollow resin product 1 which is similarly separated at the separated position.

While the resin material is prepared from that having a black or gray tone in the aforementioned embodiment, the same may alternatively be prepared from that containing an additive absorbing a laser beam such as $TiO_2$ (titanium dioxide). Also in this case, cutting can be smoothly performed, similarly to the above.

While the above embodiment has been described with reference to a method of manufacturing the wire harness protector 2, the present invention is also applicable to an under protector for an automobile or a household electric appliance.

The inventive method is also applicable to a resin molding such as an under protector for an automobile or a household electric appliance.

In practice, an NC horizontal parison blow molding machine comprising an in-line screw unit, an X/Y/Z axis driving part and an NC unit, and a YAG laser articulated robot system having an operating speed of 2 m/min. are employed to manufacture a wire harness protector for an automobile. First, necessary mounting members such as a grip and a flange portion are inserted in proper positions of a metal mold and a resin material is molded by NC blow molding under conditions of a program origin X of 100, a program origin Y of 300, a nozzle diameter of 9.0 mm, a cope and a drag under the room temperature, a stroke of 100 mm, a screw rotational frequency of 95 r.p.m., a screw back pressure of 10 kg/cm$^2$ and a temperature of 195° C. at the forward end of a heating cylinder, to form a hollow resin product. Thereafter the cope is released and opened so that the hollow resin product stored in the drag, which is moved by a turntable, is cut with a laser beam along a cut portion located on a divided plane. The remaining portion of the as-cut hollow resin product, which is taken out from the drag by a robot, is cut to complete a wire harness protector. In an experiment, the cycle time of blow molding was 5 to 6 minutes, and it was possible to sufficiently link with a YAG laser articulated robot system.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a harness part for an automobile, said method comprising the steps of:

numerically controlled (NC) blow molding a hollow resin product from a resin material by NC blow molding a parison arranged in a metal mold, wherein said NC blow molding step includes co-extruding a different material, which is unbondable to said resin material, into said parison in the form of a stripe for partitioning said resin material along a circumferential direction of said parison in correspondence to a separated position of said hollow resin product, thereby molding said hollow resin product;

laser beam machining said hollow resin product by cutting said hollow resin product with a laser beam thereby manufacturing a solid harness part for an automobile; and inserting a mounting member in a prescribed position of said metal mold in advance of said NC blow molding step, so that said mounting member is insert-molded by said NC blow molding step;

further comprising the step of forming a suspended extending portion having a substantially U-shaped section so as to extend on one side of said hollow resin product, which includes:

forming the different material, which is unbondable to the resin material, to be arranged in a vertical intermediate position of an inner wall portion of said suspended extending portion, removing the different material whereby a clearance between the inner wall portion and an outer wall portion of said suspended extending portion is formed to be one of substantially identical to and slightly narrower than a thickness of the inner wall portion, and fitting a left part of the inner wall portion in the clearance between the inner wall portion and the outer wall portion of said suspended extending portion, whereby a locked state is maintained.

* * * * *